(12) United States Patent
Goleski et al.

(10) Patent No.: US 8,834,310 B2
(45) Date of Patent: Sep. 16, 2014

(54) PATHS FOR SUPPLYING FLUID TO CLUTCHES OF AN AUTOMATIC TRANSMISSION

(71) Applicant: Ford Global Technologies, LLC, Dearborn, MI (US)

(72) Inventors: Gregory D. Goleski, Rochester Hills, MI (US); Steven G. Thomas, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 139 days.

(21) Appl. No.: 13/659,063

(22) Filed: Oct. 24, 2012

(65) Prior Publication Data

US 2014/0110213 A1 Apr. 24, 2014

(51) Int. Cl.
*F16H 3/44* (2006.01)
*F16D 48/02* (2006.01)
*F16D 25/10* (2006.01)

(52) U.S. Cl.
USPC .. 475/138; 475/331; 192/48.601; 192/48.611

(58) Field of Classification Search
USPC .......................... 475/116, 138, 331, 275–291; 192/48.601, 48.611, 48.618, 85.25
See application file for complete search history.

(56) References Cited

U.S. PATENT DOCUMENTS

| | | | | |
|---|---|---|---|---|
| 5,647,816 A | * | 7/1997 | Michioka et al. | 475/285 |
| 6,929,576 B2 | * | 8/2005 | Armstrong et al. | 475/278 |
| 7,070,532 B2 | * | 7/2006 | Stevenson et al. | 475/116 |
| 7,470,208 B2 | | 12/2008 | Tiesler et al. | |
| 7,789,792 B2 | | 9/2010 | Kamm et al. | |
| 7,980,986 B2 | | 7/2011 | Kamm et al. | |
| 8,092,336 B2 | | 1/2012 | Hart et al. | |
| 2006/0086586 A1 | * | 4/2006 | Braford | 192/87.11 |
| 2008/0207386 A1 | * | 8/2008 | Nishida et al. | 475/276 |
| 2010/0279814 A1 | | 11/2010 | Brehmer et al. | |
| 2013/0075217 A1 | * | 3/2013 | Seo et al. | 192/48.601 |
| 2014/0110209 A1 | * | 4/2014 | Goleski et al. | 192/48.601 |
| 2014/0113763 A1 | * | 4/2014 | Maurer et al. | 475/282 |

* cited by examiner

*Primary Examiner* — Roger Pang
(74) *Attorney, Agent, or Firm* — James Dottavio; MacMillan, Sobanski & Todd, LLC

(57) ABSTRACT

An assembly including an input including first, second, third and fourth passages, a shaft surrounding the input, a housing including a hub surrounding the shaft, a first path connecting the first passage to a first servo cylinder, a second path connecting the second passage to a second servo cylinder, a third path connecting the third passage to balance volumes, and a fourth path connecting the fourth passage to a third servo cylinder, bypassing the hub.

16 Claims, 5 Drawing Sheets

PATHS FOR SUPPLYING FLUID TO CLUTCHES OF AN AUTOMATIC TRANSMISSION

BACKGROUND OF THE INVENTION

1. Field of the Invention

This invention relates generally to an apparatus for an independent, rotating, multi-clutch assembly having no fixed connection to a component of a gearset.

2. Description of the Prior Art

The kinematic arrangement of automatic transmissions, certain control elements, such as hydraulically-actuated clutches, have no fixed connection to any other transmission lever component.

In such cases, a need exists for a technique that simplifies the feed circuit to those clutches, i.e. pressure feeds for each of three clutch-apply circuits and a lube circuit that supplies three balance dams.

In the kinematic arrangement of the subject automatic transmission, three clutches have no fixed connection to any other transmission lever components. Instead of locating the clutches such that their servo cylinders are enclosed in one large clutch housing, multiple options regarding the location of at least one of the servo cylinders provides means for optimizing the clutch module.

SUMMARY OF THE INVENTION

An assembly including an input including first, second, third and fourth passages, a shaft surrounding the input, a housing including a hub surrounding the shaft, a first path connecting the first passage to a first servo cylinder, a second path connecting the second passage to a second servo cylinder, a third path connecting the third passage to balance volumes, and a fourth path connecting the fourth passage to a third servo cylinder, bypassing the hub.

Three clutches are integrated into a rotating clutch housing, which includes four feed circuits. A lube circuit supplies three clutch balance dams. A clutch-apply circuit communicates with each of the clutches.

Changing the location of the pistons reduces the total number of seals required. Separating the clutch pistons reduces the number and size of the rotating seals, thereby potentially improving fuel economy.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
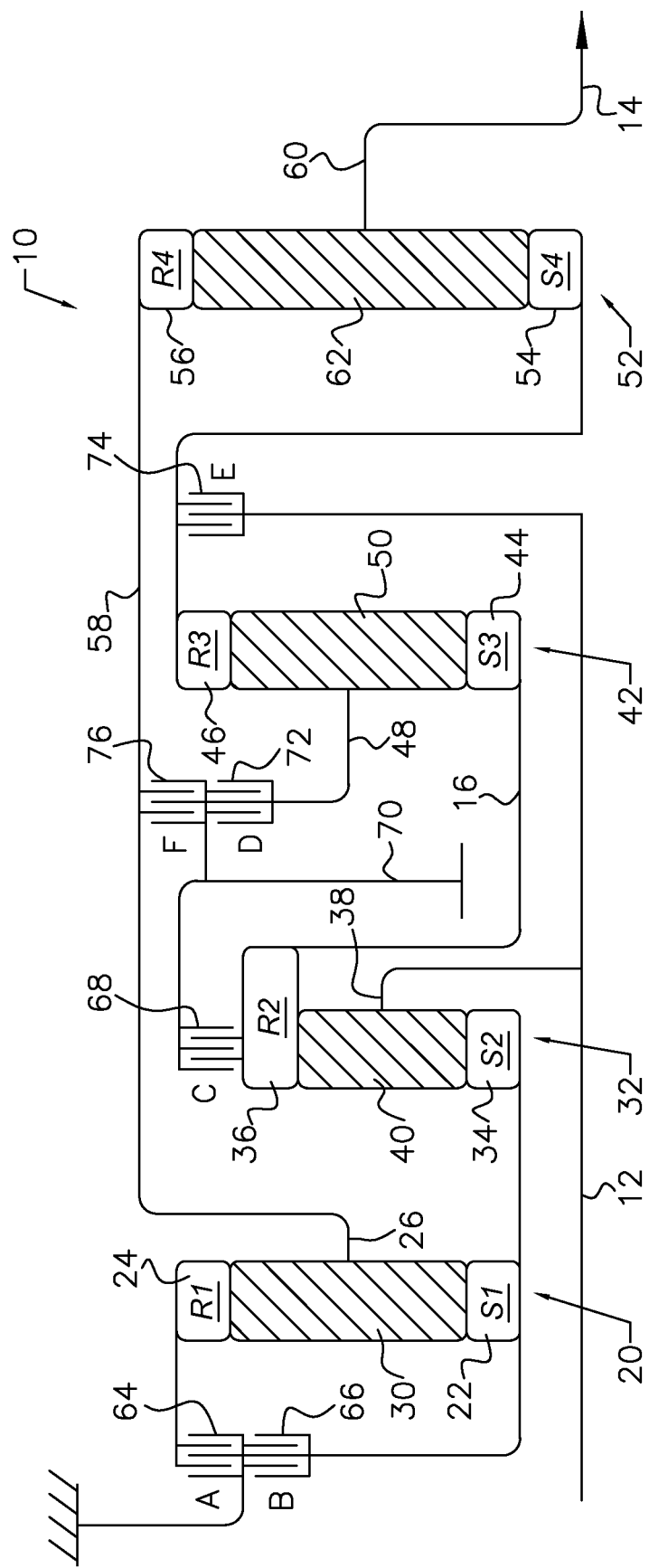
FIG. 1 is a schematic diagram of the kinematic assembly for a motor vehicle automatic transmission.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70 rotation also on the transmission case 124.

A second clutch 72 selectively couples carrier 48 to clutch housing 70.

A third clutch 74 selectively couples ring gear 46 and sun gear 54 to input 12.

A fourth clutch 76 selectively couples shell 58 to clutch housing 70.

Figure 2:
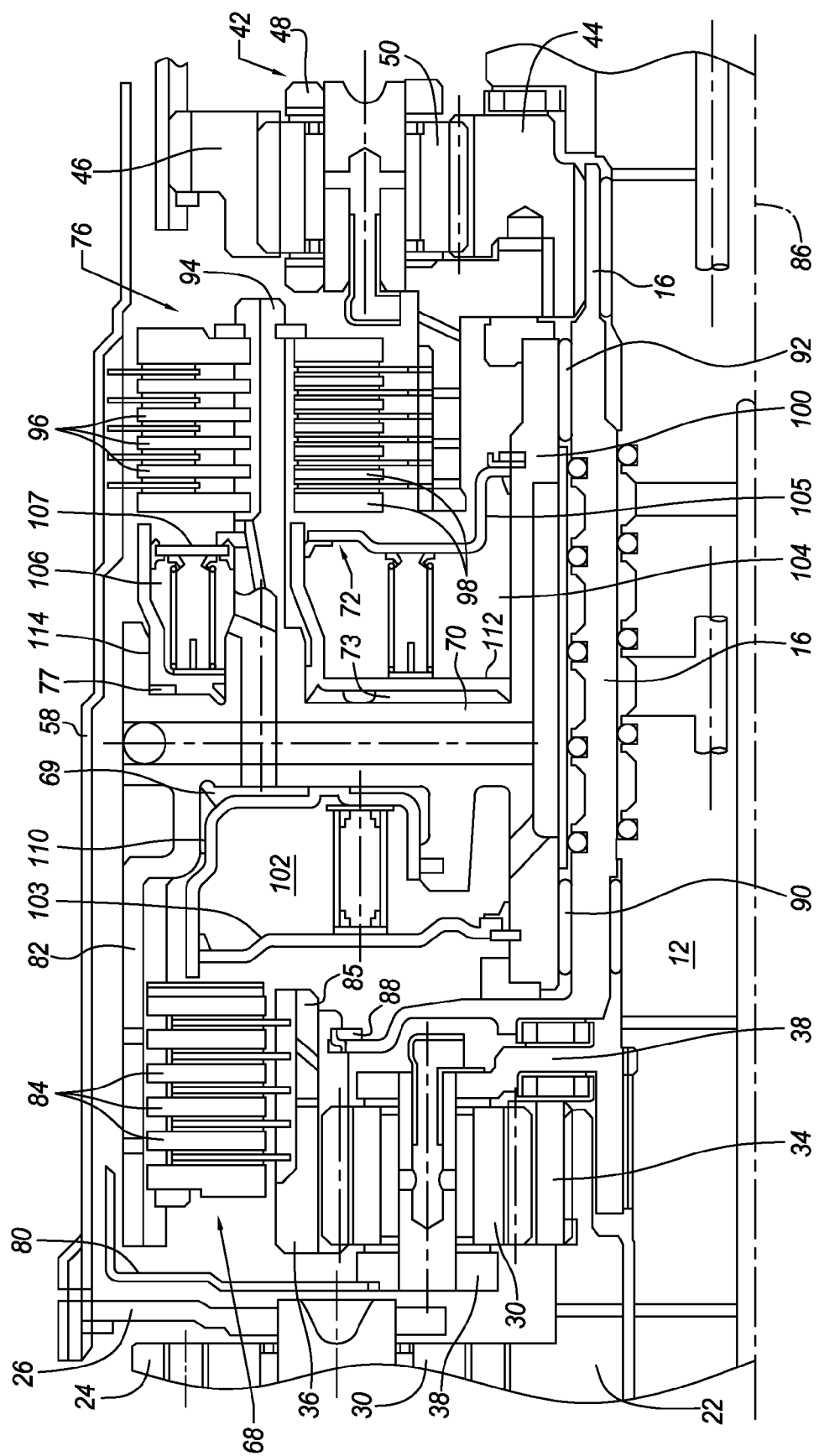
FIG. 2 is a cross section of the kinematic assembly of FIG. 1.

FIG. 2 shows that carrier 26 is secured to shell 58. Clutch housing 70 includes an axial arm 82 formed with internal spine teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 85 where a snap ring 88 completes the connection. Clutch housing 70 is supported by axially spaced bushings 90, 92 on the radial outer surface of intermediate shaft 16.

Clutch housing 70 includes another axial arm 94 formed with external spine teeth, to which internal teeth on the spacer plates 96 of clutch 76 are fixed for rotation with clutch housing 70. The friction plates of clutch 76 are splined to internal spline teeth formed on shell 58.

External teeth 98 on the spacer plates of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single lube circuit supplies automatic transmission fluid (ATF) to the pressure balance volumes 102, 104, 106 of clutches 68, 72 and 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating, clutch-apply pressure through individual circuits formed in the clutch housing 70. When no actuating pressure is applied to clutches 68, 72, 76, the clutch housing 70 has no fixed connection to any other component of assembly 10.

Figure 3:
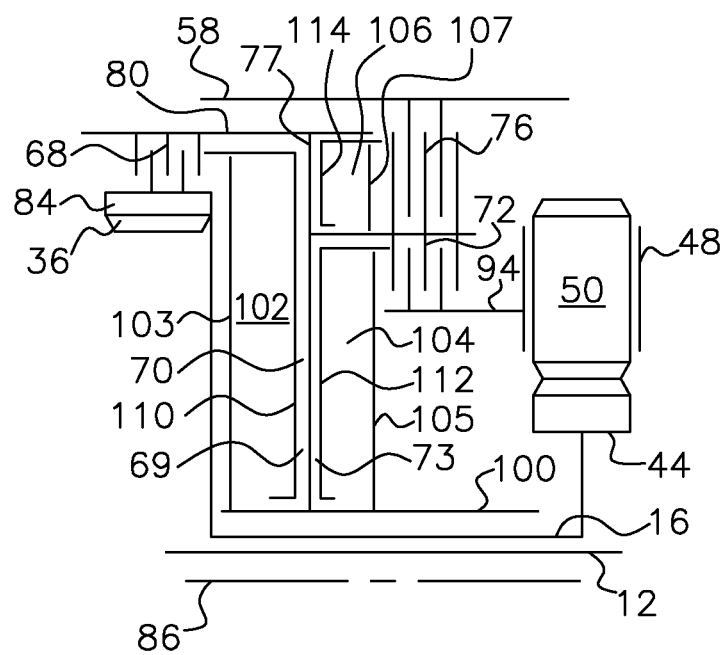
FIG. 3 is a schematic diagram of the clutch housing of the kinematic assembly and an arrangement of related clutch oil feed paths.

FIG. 3 shows schematically the arrangement of FIG. 2, in which all of the three clutch pistons 110, 112, 114 and balance dams 103, 105, 107 are located in clutch housing 70.

Four axial passages are formed in input shaft. Each of three of the passages carry fluid at clutch-apply pressure to a respective servo cylinder 69, 73, 77 from the input shaft 12, through intermediate shaft 16 and into the clutch housing 70. Similarly the third input shaft passage carries lube to the balance volumes 102, 104, 106 from the input shaft 12, through intermediate shaft 16 and into the clutch housing 70.

In the arrangement of FIG. 3, clutch complexity is associated with the clutch housing 70 since all three sets of balance dams 103, 105, 107, clutch friction plates and clutch spacer plates are assembled together as one unit. Clutch 68 releaseably connects clutch housing 70 to ring gear 36. Clutch 72 clutch releaseably connects the clutch housing 70 to carrier 48. Clutch 76 releaseably connects clutch housing 70 to carrier 26 and ring gear 56 though shell 58.

Figure 4:
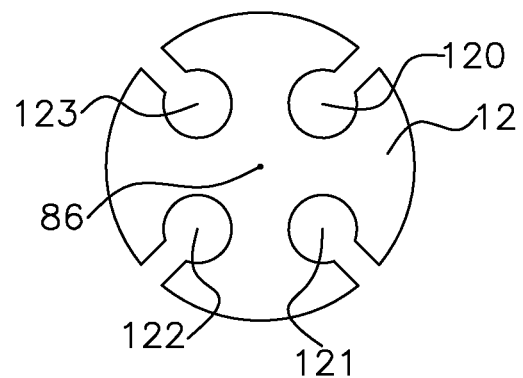
FIG. 4 is an end view of the input shaft showing axial, fluid passages in the shaft.

FIG. 4 shows the arrangement of axial, fluid passages 120, 121, 122, and 123 and local, radial passages in the input shaft 12, which is centered at axis 86. Each radial passage connects one of the axial passages to one of the corresponding clutches 68, 72, 76.

Figure 5:
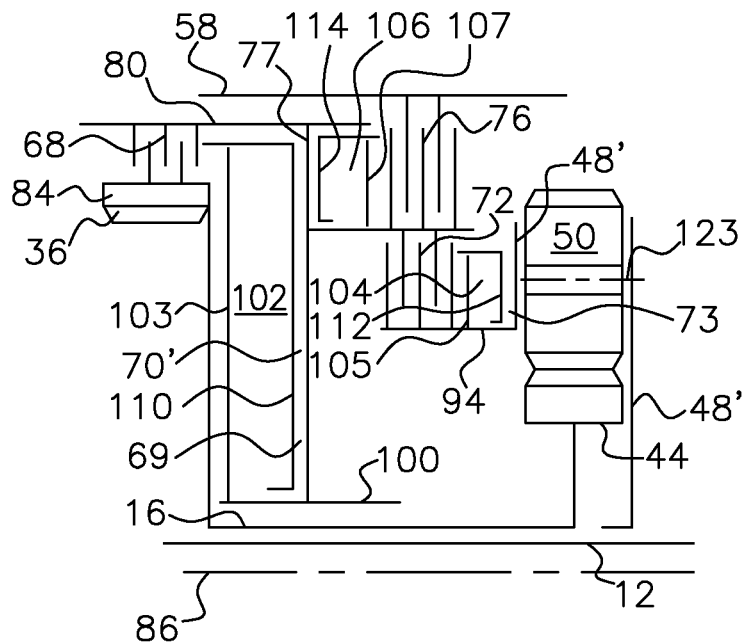
FIG. 5 is a schematic diagram of the clutch housing of the kinematic assembly and an alternate arrangement of related clutch oil feed paths.

FIG. 5 shows schematically a kinematic arrangement, in which two of the clutch pistons 110, 114 and two of the balance dams 103,107 are located in clutch housing 70. The piston 112, balance volume 104 and balance dam 105 of clutch 72 are located in the planetary carrier 48'.

ATF at clutch-apply pressure is supplied to servo cylinders 69, 77, and lube is supplied to balance volumes 102, 106 from input shaft 12 through intermediate shaft 16 into clutch housing 70. ATF at clutch-apply pressure is supplied to servo cylinder 73 directly from input shaft 12 to the right-hand side of carrier 48' and leftward either through an axial passage is planet pinions 50' or through an axial passage in carrier 48'.

Figure 6:
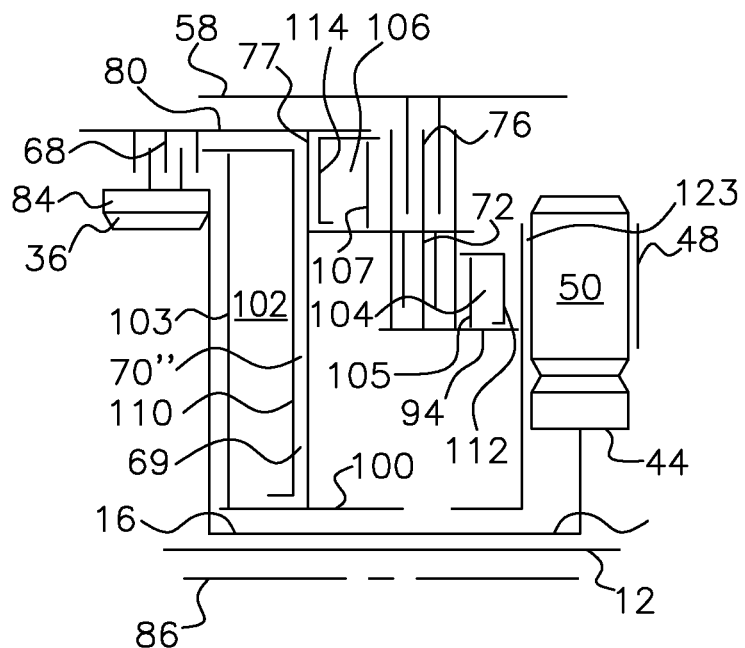
FIG. 6 is a schematic diagram of a clutch housing of the kinematic assembly and another arrangement of related clutch oil feed paths.

FIG. 6 shows schematically an alternate kinematic arrangement to that of FIG. 4, clutch feed oil and balance oil are fed into the left-hand side of carrier 48 from the input shaft 12 through intermediate shaft 16.

In the arrangement of FIG. 5 oil is fed to clutch 72 through only 1 set of seals, i.e., seals for oil flowing from input shaft 12 to carrier 48, whereas in FIGS. 3 and 6 two sets of seals are required, one set for oil from input shaft 12 to intermediate shaft 16, and a second set of seals for oil flowing from intermediated shaft 16 to the hub 100 of clutch housing 70.

In the arrangements of FIGS. 5 and 6, clutch 68 releaseably connects clutch housing 70 to ring gear 36. Clutch 72 clutch releaseably connects clutch housing 70 to carrier 48, 48'. Clutch 76 releaseably connects clutch housing 70 to carrier 26 and ring gear 56 though shell 58.

Figure 7:
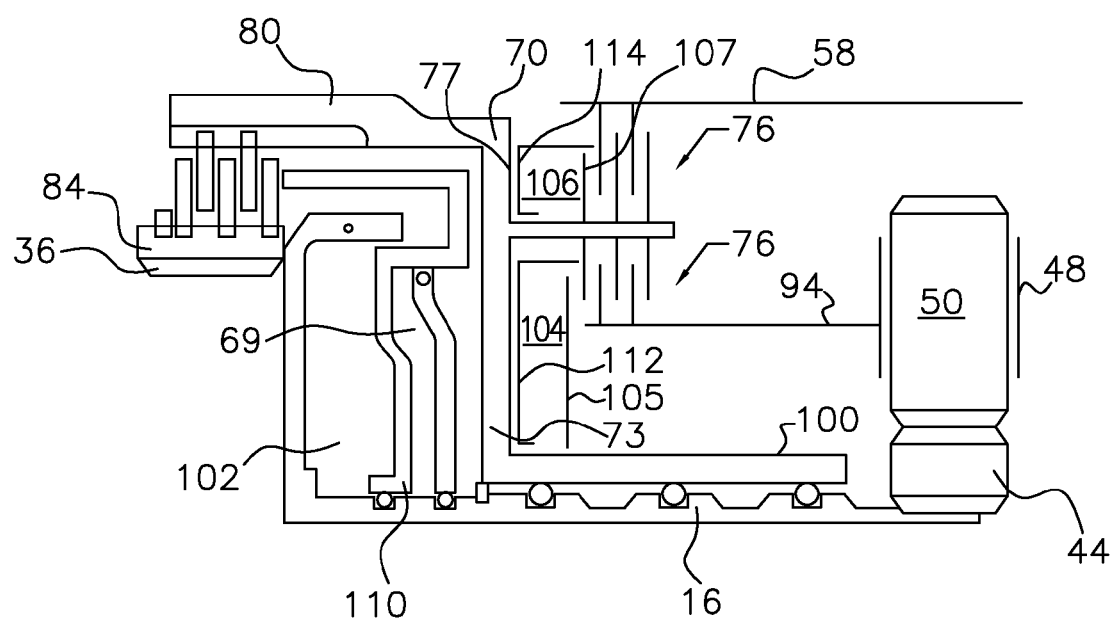
FIG. 7 is a schematic diagram of a clutch housing of the kinematic assembly and another arrangement of related clutch oil feed paths.

FIG. 7 shows schematically a kinematic arrangement, in which two of the clutch pistons 112, 114 and two of the balance dams 105,107 are located in clutch housing 70. The piston 110, balance volume 102 and balance dam 103 of clutch 68 are located in the intermediate shaft 16, which connects ring gear 84 and sun gear 44.

For clutches 72 and 76, oil is fed from input shaft 12 through the intermediate shaft 16 into the clutch housing 70. For clutch 68, clutch feed oil and balance volume oil are fed into the intermediate shaft 16 directly from the input shaft 12.

In the arrangement of FIG. 6, lube oil is supplied to balance volume 102 and oil at clutch-apply pressure is supplied to servo cylinder 69 for clutch 68 through only one set of seals, i.e., seals for oil flowing from input shaft 12 to intermediate shaft 16. Clutch 68 releaseably connects clutch housing 70 to ring gear 36. Clutch 72 clutch releaseably connects clutch housing 70 to carrier 48. Clutch 76 releaseably connects clutch housing 70 to carrier 26 and ring gear 56 though shell 58.

In accordance with the provisions of the patent statutes, the preferred embodiment has been described. However, it should be noted that the alternate embodiments can be practiced otherwise than as specifically illustrated and described.

The invention claimed is:

1. An assembly, comprising:
   an input including first, second, third and fourth passages;
   a shaft surrounding the input;
   a housing including a hub surrounding the shaft, a first path connecting the first passage to a first servo cylinder, a second path connecting the second passage to a second servo cylinder, a third path connecting the third passage to balance volumes;
   a fourth path connecting the fourth passage to a third servo cylinder, bypassing the hub.

2. The assembly of claim 1, further comprising:
   first, second and third clutches; and
   wherein the first servo cylinder and a first of the balance volumes are associated with the first clutch, the second servo cylinder and a second of the balance volumes are associated with the second clutch, and the third servo cylinder and a third of the balance volumes are associated with the third clutch.

3. The assembly of claim 2, wherein each of the clutches further comprises:
   one of the servo cylinders, communicating with one of the first, second and third passages;
   a piston located in said one of the servo cylinders;
   a balance dam located in the servo cylinders, defining one of the balance volumes communicating with the third passage; and
   a spring urging the piston away from the balance dam.

4. The assembly of claim 1, wherein each of the first, second and third paths extends from one of the passages, respectively, through the input, the shaft and the hub.

5. The assembly of claim 1, wherein the fourth path extends from the fourth passage through the input and the shaft.

6. The assembly of claim 1, wherein:
   the assembly further comprises a gearset including a carrier; and
   the fourth path extends from the fourth passage, through the carrier, to the third servo cylinder.

7. The assembly of claim 1, wherein:
   the assembly further comprises a gearset including a carrier, a pinion supported on the carrier and formed with a conduit extending through pinion; and
   the fourth path extends from the fourth passage, to the carrier, through the conduit, to the third servo cylinder.

8. The assembly of claim 1, wherein the shaft defines a surface of one of the balance volumes.

9. An assembly, comprising:

an input including first, second, third and fourth passages;

a first gear set including a ring gear;

a second gearset including a sun gear;

a shaft surrounding the input and connecting the ring gear and the sun gear;

a housing including a hub surrounding the shaft, a first path connecting the first passage to a first servo cylinder, a second path connecting the second passage to a second servo cylinder, and a third path connecting the third passage to balance volumes; and a fourth path connecting the fourth passage to a third servo cylinder, bypassing the hub.

10. The assembly of claim 9, further comprising:

first, second and third clutches; and wherein the first servo cylinder and a first of the balance volumes are associated with the first clutch, the second servo cylinder and a second of the balance volumes are associated with the second clutch, and the third servo cylinder and a third of the balance volumes are associated with the third clutch.

11. The assembly of claim 10, wherein each of the clutches further comprises:

one of the servo cylinders, communicating with one of the first, second and third passages;

a piston located in said one of the servo cylinders;

a balance dam located in the servo cylinders, defining one of the balance volumes communicating with the third passage; and a spring urging the piston away from the balance dam.

12. The assembly of claim 9, wherein each of the first, second and third paths extends from one the passages, respectively, through the input, the shaft and the hub.

13. The assembly of claim 9, wherein the fourth path extends from the fourth passage through the input and the shaft.

14. The assembly of claim 9, wherein:

the assembly further comprises a gearset including a carrier; and the fourth path extends from the fourth passage, through the carrier, to the third servo cylinder.

15. The assembly of claim 9, wherein:

the assembly further comprises a gearset including a carrier, a pinion supported on the carrier and formed with a conduit extending through pinion; and the fourth path extends from the fourth passage, to the carrier, through the conduit, to the third servo cylinder.

16. The assembly of claim 9, wherein the shaft defines a surface of one of the balance volumes.

\* \* \* \* \*